No. 615,287. Patented Dec. 6, 1898.
J. D. LORD.
BICYCLE BELL.
(Application filed Nov. 18, 1897.)
(Model.) 2 Sheets—Sheet 1.
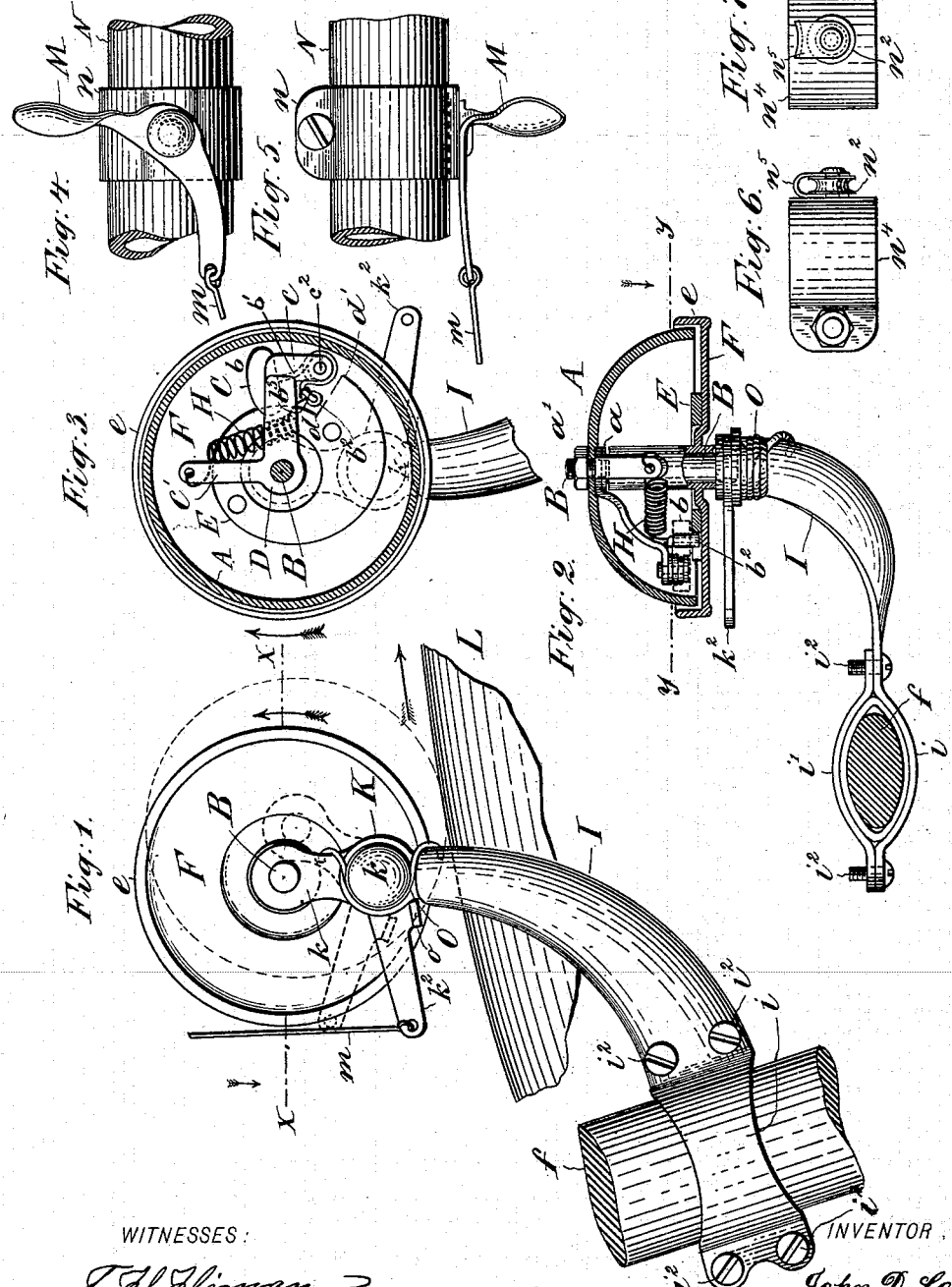
WITNESSES:
INVENTOR,
John D. Lord
BY
ATTORNEY.

No. 615,287. Patented Dec. 6, 1898.
J. D. LORD.
BICYCLE BELL.
(Application filed Nov. 18, 1897.)
(Model.) 2 Sheets—Sheet 2.
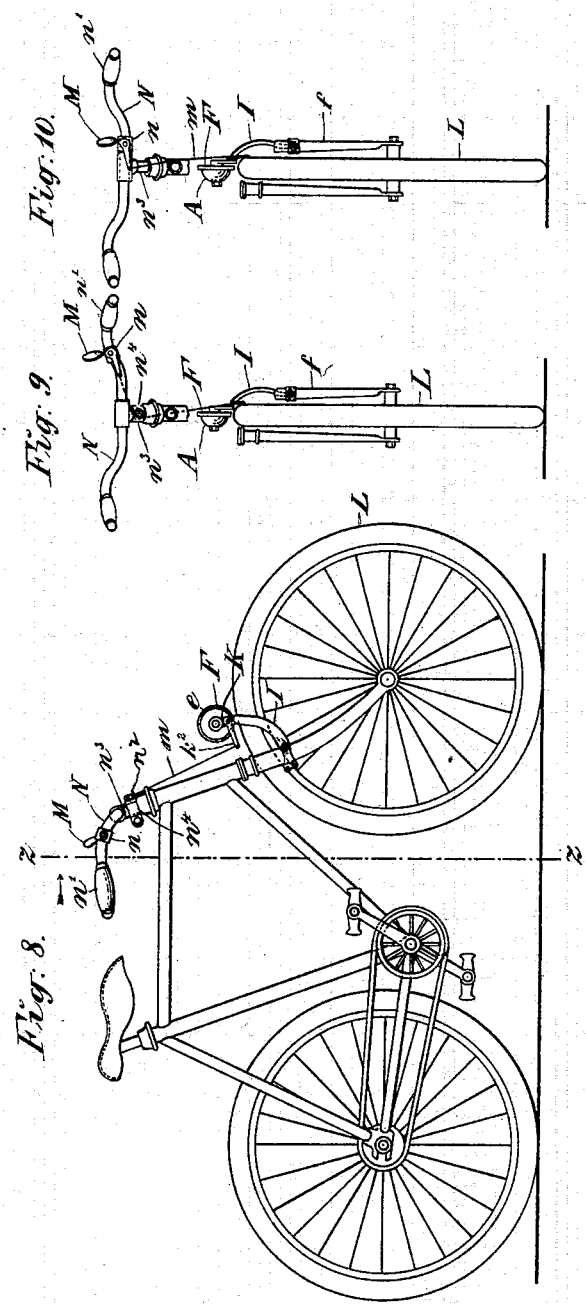
WITNESSES:
J. W. Wiman
R. F. Sweeny
INVENTOR
John D. Lord.
BY
ATTORNEY

UNITED STATES PATENT OFFICE.

JOHN D. LORD, OF NEW YORK, N. Y., ASSIGNOR OF ONE-HALF TO PETER HORN, OF SAME PLACE.

BICYCLE-BELL.

SPECIFICATION forming part of Letters Patent No. 615,287, dated December 6, 1898.

Application filed November 18, 1897. Serial No. 658,957. (Model.)

*To all whom it may concern:*

Be it known that I, JOHN D. LORD, a citizen of the United States, and a resident of New York, (Brooklyn,) in the county of Kings and State of New York, have invented certain new and useful Improvements in Bells and in their Attachments, of which the following is a specification.

My invention relates more particularly to alarm-bells that are designed for attachment to bicycles and other vehicles and are operated by one of the wheels thereof, its object being to provide a bell of this class and suitable attachments therefor whereby it may be applied to a bicycle or other vehicle, which shall be simple in construction, efficient in operation, and not liable to get out of order.

To these ends the invention consists, first, in the peculiarities of construction of the bell itself, and, second, in the means whereby the attachment of the bell as thus constructed to the fork of a bicycle may be effected and its operation when required accomplished, all as will hereinafter more fully appear.

Referring to the accompanying drawings, which form a part of this specification, Figure 1 is a side elevation of the bell and one form of supporting-hanger therefor, showing also a portion of a wheel and a portion of a bicycle-fork or other convenient part to which the hanger may be secured; Fig. 2, a horizontal sectional view of the bell, taken in plane $x$ $x$ of Fig. 1, showing also the hanger therefor in plan and the fork or other support to which the hanger is secured in transverse section; Fig. 3, a sectional elevation of the bell, taken in the plane $y$ $y$ of Fig. 2 and looking in the direction of the arrow in that figure, showing also a part of the hanger for the bell in side elevation; Fig. 4, a side elevation of the thumb-lever by which the bell is brought into contact with the wheel, showing also the clip by means of which it is secured to the handle-bar or other convenient part, which is also illustrated in rear elevation; Fig. 5, a plan view of the parts shown in Fig. 4; Fig. 6, an edge view of one of the sheaves over which the cord or other connection from the thumb-lever to the bell is led, with the clip by means of which it is secured to the handle-bar or other support; Fig. 7, a side elevation of the parts shown in Fig. 6; Fig. 8, a side elevation of a bicycle with my invention applied in connection therewith; Fig. 9, a rear sectional elevation thereof, taken in the plane $z$ $z$ of Fig. 8, with the thumb-lever arranged near the grip of the handle-bar; and Fig. 10, a similar rear sectional elevation of the same and taken in the same plane of Fig. 8, with the thumb-lever arranged in a slightly-different position.

In all the figures like letters of reference are employed to designate corresponding parts.

A indicates a bell, and B a stud upon which it is mounted. In the construction of this bell any of the ordinary or approved forms may be selected. I prefer, however, to construct it in a hemispherical form and to provide the stud B at or near its end with a collar $a$, between which and a nut $a'$ on the former it is firmly clamped.

Arranged in proper relationship to and in the present instance within the bell A is the tongue C, by means of which the bell is sounded when required. This hammer $b$ is preferably provided with a hammer-arm $d'$, extending from the hammer and formed into a coil about a pin $c^2$, depending from one arm of an angulated support D, about which the coil has pivotal movement, and terminating in a pintle $d^3$, carrying a friction-roller $d^2$, that is adapted to ride on the face of the cam E. The support D is clamped at or near its angular portion between the shoulder $a$ and the interior of the bell by the nut $a'$. As thus arranged the hammer is free to be carried back away from the bell and then moved forward against the same when the sounding of the latter is required.

To provide for carrying the hammer back away from the bell preparatory to its forward movement to strike the same, I make use of a volute-cam E, which is preferably secured to the inner side of a disk F, that is loosely journaled upon the stud B, so as to be free to rotate thereon, and is preferably, though not necessarily, provided around its periphery with a laterally-projecting flange $e$, that extends over the larger end of the bell and serves as a rim or surface to which power to effect a rotation of the disk may be applied.

In the construction of the cam E its operating-surface, commencing at the point $d$ of least radius, preferably extends one complete revolution around the axis of the cam, with a gradually-increasing radius until it reaches the point $d'$, where its radius is the greatest, and at this point it returns radially to the point $d$ of its commencement. As thus formed this operating-surface engages with the friction-roller $d$ of the hammer-arm, and serves thereby, as the cam is rotated by the disk F in the direction of the arrow in Fig. 3, to gradually withdraw the hammer from the bell and carry it over to the left in that figure until the point $d'$ thereon passes from beneath the stud or abutment $b^2$, when such hammer is free to be carried forward against the bell by the energy of the spring H to effect the sounding thereof.

To accomplish the requisite forward movement of the hammer to effect the striking of the bell when the stud or abutment $b^2$ is free from the operating-surface of the cam E, while yet permitting of its rebound after such impact to remove it therefrom, I make use of the coiled spring H, which is secured at one of its ends to the upwardly-extending arm $c'$ of the support D and at its other to the pintle $b^3$ on the arm $b'$ of the hammer. The spring being arranged as above explained tends at all times to move the hammer forward toward the bell, while the cam E, on the other hand, serves to withdraw it backward therefrom against the stress of such spring, and thus by their conjoint action they impart an alternate forward and backward movement thereto to strike the bell when the cam E is rotated by the disk F in the required direction, which movement will be continued as long as the rotation of the disk is continued.

The bell A, with its supporting-stud and cooperating parts being constructed and arranged as above explained, may be applied to any of the various forms of vehicle and operated therefrom by securing it in such a position with respect to one of the wheels thereof that the disk F may be carried into contact therewith when required.

For applying the bell in connection with a bicycle I preferably make use of a bracket-arm I, which, provided at its lower end with suitable clamping members $i$ and $i'$, is inclined inward laterally along its upper portion and has pivoted to its upper end by a pivot $k$ a bell-crank lever K, in the upper extremity of the vertical arm $k'$ of which is fixedly secured the end of the stud B, upon which the bell and the parts immediately cooperating therewith are supported. As thus constructed, the application of this bracket-arm and the parts carried thereby to the bicycle is effected by securing it to one of the front forks $f$ in such a position thereon as to bring the bell A slightly above the forward wheel L, with the rim $e$ of the disk F directly over the longitudinal central line of the same, which may be accomplished through the intermediaries of the clamping members $i$ $i'$ and the coöperating screws $i^2$. In this position the rim of the disk is free from contact with the wheel and the bell is inoperative, as shown by full lines in Fig. 1. To render the bell operative when it is desired to strike the same and the bicycle is in motion, it is necessary to swing the bell-crank lever K forward on its pivot $k$ until the rim $e$ is brought into contact with the wheel L, or into the position indicated by dotted lines in Fig. 1. In this position the striking of the bell will be effected by the rotation of the cam E from the wheel L through the disk F and the same continued as long as the rim of the disk is in contact with such wheel and the latter is in rotation, but will cease the moment that it is carried away therefrom.

The means whereby the bell-crank lever is swung forward to carry the rim $e$ of the disk F in contact with the wheel L when the striking of the bell is required may be of various kinds. I prefer, however, to make use of a thumb-lever M, which is pivoted to the rear side of the handle-bar N by a suitably-formed clamping-clip $n$ and is connected at its free end with the extremity of the horizontally-disposed arm $k^2$ of the bell-crank lever K through the intermediary of a cord or other appropriate connection $m$. In some instances I find it desirable to arrange this thumb-lever M on the handle-bar N in close relationship to the handle or grip $n'$, as shown in Fig. 9, and in these cases I find it convenient to employ an idler-sheave $n^2$, over which the cord or connection $m$ is passed and which is preferably pivoted to the front side of the vertical stem $n^3$ of the handle-bar N by a suitable clamping-clip $n^4$. In other instances I find it desirable to arrange the thumb-lever M near the middle of the handle-bar N, as shown more especially in Fig. 10, and in these cases the sheave $n^2$ may be dispensed with and the cord or connection $m$ led directly from the free end of the thumb-lever M downward to the extremity of the horizontally-disposed arm $k^2$ of the bell-crank lever K. Either of these arrangements may be adopted, as may be preferred, and the bell operated with equal efficiency.

When the arrangement of the thumb-lever M shown in Fig. 9 is adopted and the sheave $n^2$ is made use of, I find it desirable to employ the keeper $n^5$ to prevent the escape of the cord or connection $m$ from the sheave, and when so employed I preferably extend it over such sheave and pivot it upon the same pivot that supports the latter, whereby to be capable of adjustment around the same to adapt it to the line of travel of the cord or connection in whatever direction to and around the sheave it may happen to be.

For withdrawing the disk F from the wheel L after it has been carried into contact therewith and for yieldingly holding it, with the bell-crank lever K, in its normal position I make use of the spring O, which is preferably coiled around the pivot $k$, with one of its ends engaging with the upper end of the bracket-arm I and the other end engaging with the vertical arm $k'$ of the bell-crank lever K, a suitable stop $o$, secured to the under side of the horizontally-disposed arm $k^2$ of such lever, engaging with the upper end of the bracket-arm I, preventing the backward movement of the parts beyond a certain limit.

With the several parts constructed and arranged as above explained a simple and efficient bell is produced which is adapted for application to a bicycle or other form of vehicle and which when brought into proper relationship to the appropriate wheel thereof automatically effects the striking of the bell therefrom.

In the foregoing I have described a bracket-arm I, that is adapted for use in connection with a bicycle when the bell is to be applied to that form of vehicle, as is the case with certain of the parts by means of which the disk F is brought into contact with the operating-wheel; but it is to be understood that the bell is not restricted to that application alone, as it is obvious that it may be applied to other forms of vehicle, in which cases this bracket-arm and the parts mentioned will be modified to suit them to the location in which they are employed without eliminating therefrom any of their essential characteristics. Again, while I have described the cam which retracts the tongue from the bell as provided with an operating-surface formed as a volute that extends once around its axis I do not limit myself thereto, as it is obvious that instead thereof I may construct this operating-surface with a number of shorter volute-shaped projections around the same without departing from the spirit of my invention.

Having thus described my invention and specified certain of the ways in which it is or may be carried into effect, I claim and desire to secure by Letters Patent of the United States—

1. The combination, with a bell, a clapper arranged within the same, a stud upon which the bell and clapper are mounted, and a spring whereby the clapper-hammer is moved forward against the bell, of a volute cam engaging with said clapper, and a disk for rotating said cam adapted to bear against, and be rotated itself from, a wheel, and also mounted, with such cam, upon the stud, substantially as described.

2. The combination, with a bracket-arm, provided with clamping members at its lower end whereby it may be secured to one of the forks of a bicycle, a bell-crank lever pivoted to its upper end, a bell, a clapper therefor, a spring for moving the clapper-hammer against the bell, a volute cam for withdrawing the clapper-hammer therefrom, a disk for rotating said cam adapted to bear upon, and be rotated itself from, a bicycle-wheel, and a stud upon which the bell, clapper, cam, and disk, are mounted, secured to the bell-crank lever, of a thumb-lever, means through which it may be pivoted to the handle-bar, and a cord or connection intermediate the thumb-lever and the bell-crank lever, substantially as described.

In testimony whereof I have hereunto set my hand this 16th day November, 1897.

JOHN D. LORD.

Witnesses:
PETER HORN,
WM. H. APPLETON.